United States Patent
Cheng et al.

(10) Patent No.: US 10,965,839 B2
(45) Date of Patent: Mar. 30, 2021

(54) DEVICE AND METHOD FOR PROCESSING IMAGE ARRAY DATA, AND COLOR TABLE GENERATION METHOD THEREOF

(71) Applicant: Industrial Technology Research Institute, Hsin-Chu (TW)

(72) Inventors: Yuan-Po Cheng, Taipei (TW); Guo-Ruei Chen, Yunlin County (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 95 days.

(21) Appl. No.: 16/199,678

(22) Filed: Nov. 26, 2018

(65) Prior Publication Data
US 2019/0379802 A1 Dec. 12, 2019

(30) Foreign Application Priority Data
Jun. 12, 2018 (TW) .................. 107120246

(51) Int. Cl.
| | | |
|---|---|---|
| G06K 9/00 | (2006.01) | |
| H04N 1/60 | (2006.01) | |
| H04N 1/40 | (2006.01) | |
| G06T 11/00 | (2006.01) | |
| H04N 5/33 | (2006.01) | |

(52) U.S. Cl.
CPC ............. *H04N 1/60* (2013.01); *G06T 11/001* (2013.01); *H04N 1/40012* (2013.01); *H04N 5/33* (2013.01)

(58) Field of Classification Search
CPC .......... H04N 1/60; H04N 1/6027; H04N 1/62; G06T 11/001; G06T 11/00; G06T 7/11; G06T 7/90
See application file for complete search history.

(56) References Cited

U.S. PATENT DOCUMENTS

| | | |
|---|---|---|
| 4,799,053 A | 1/1989 | Van Aken et al. |
| 7,304,297 B1 | 12/2007 | King et al. |
| | (Continued) | |

FOREIGN PATENT DOCUMENTS

| | | |
|---|---|---|
| CN | 101072353 A | 11/2007 |
| CN | 102779351 | 11/2012 |
| | (Continued) | |

OTHER PUBLICATIONS

TW OA issued on May 31, 2019.
(Continued)

*Primary Examiner* — Samir A Ahmed
(74) *Attorney, Agent, or Firm* — WPAT, PC

(57) ABSTRACT

A method for processing image array data is provided, which may include the following steps: providing the image array data detected by a sensor at a first time point and including a plurality of first blocks, and each of the first blocks has a color table corresponding thereto; segmenting the image array data detected by a sensor at a second time point into a plurality of second blocks; comparing the image array data of each first block with the image array data of each second block to generate numerical difference information; and respectively allocating the color tables corresponding to the first blocks to the second blocks matching the first blocks according to the numerical difference information.

16 Claims, 8 Drawing Sheets

(56) References Cited

U.S. PATENT DOCUMENTS

| | | | |
|---|---|---|---|
| 7,570,810 B2* | 8/2009 | Rai | H04N 9/045 |
| | | | 348/222.1 |
| 8,386,951 B2 | 2/2013 | Tallman | |
| 8,407,616 B2 | 3/2013 | Bergstrom et al. | |
| 8,565,513 B2* | 10/2013 | Shao | G06T 7/593 |
| | | | 382/154 |
| 9,251,615 B2 | 2/2016 | Schmidt et al. | |
| 9,613,558 B2* | 4/2017 | Chen | G09G 3/2003 |
| 9,635,285 B2 | 4/2017 | Teich et al. | |
| 2006/0126085 A1 | 6/2006 | Owen et al. | |
| 2010/0246938 A1* | 9/2010 | Shao | G06T 7/593 |
| | | | 382/154 |
| 2013/0307992 A1 | 11/2013 | Erlandsson et al. | |
| 2015/0009336 A1 | 1/2015 | Wang | |
| 2016/0080664 A1 | 3/2016 | Henry | |
| 2016/0232827 A1* | 8/2016 | Chen | G06T 5/003 |
| 2017/0061663 A1 | 3/2017 | Johnson et al. | |

FOREIGN PATENT DOCUMENTS

| | | |
|---|---|---|
| TW | 200540409 A | 12/2005 |
| TW | I526982 | 3/2016 |
| TW | 201723928 | 7/2017 |

OTHER PUBLICATIONS

Chuan Li et al. "Combining Markov random fields and convolutional neural networks for image synthesis", IEEE CVPR 2016. IEEE Computer Society.

Jonathan Long et al. "Fully Convolutional Networks for Semantic Segmentation" IEEE CVPR 2015.

David Menotti et al. "Multi-histogram equalization methods for contrast enhancement and brightness preserving", IEEE Transactions on Consumer Electronics, Aug. 2007.

Yan Chai Hum et al., "Multiobjectives bihistogram equalization for image contrast enhancement", Complexity, Jan. 22, 2014, Wiley Periodicals, Inc. vol. 20 No. 2.

Mehdi Roppaei et al. "Image Enhancement via Cloud Cascade Control Based Sub-Image-Clipped Histogram Equalization", 2016 IEEE International Conference on Smart Cloud, IEEE Computer Society.

Pramila Welling et al. "Brightness preserving contrast enhancement using polynomial histogram amendment", ISOCC 2012.

* cited by examiner

DEVICE AND METHOD FOR PROCESSING IMAGE ARRAY DATA, AND COLOR TABLE GENERATION METHOD THEREOF

CROSS REFERENCE TO RELATED APPLICATION

The present application is based on, and claims priority from, Taiwan Application Serial Number 107120246, filed on Jun. 12, 2018. The disclosure of which is hereby incorporated by reference herein in its entirety.

TECHNICAL FIELD

The disclosure is directed to an image processing device, an image processing method and a color table generation method.

BACKGROUND

With the advance of technology, the performance of sensors is significantly improved. Currently, many kinds of sensors are composed of sensor arrays in order to keep monitoring different targets. These sensors can detect the targets to generate image array data.

However, when the volume of data keeps increasing, it is very difficult for human eyes to observe the data. Accordingly, it has become an important issue to develop the techniques capable of displaying image array data detected by sensors for human eyes to easily observe the data.

Image array data may be obtained from various sources, such as temperature image array data detected by a thermal imaging camera, distance image array data detected by a depth camera, spectral intensity image array data detected by a spectrum sensor, ultrasonic image array data detected by a medical ultrasonic instrument, etc. In order to convert image array data into images which can be easily observed by human eyes, one of the currently available image processing methods can show the intensity of each numerical value of the image array data by a number between 0 and 255 and then display a gray-level image in a computer screen, or display a color image by red, green and blue (RGB) in the computer screen.

There are several currently available image processing methods can further optimize the image of image array data. These methods can calculate the statistics data of the image array data detected by a sensor to obtain the histogram of the image array data and then re-distribute the numerical intervals thereof according to the histogram, such as normalize, histogram equalization (Heq), advanced histogram equalization, etc. Then, these numerical values are displayed by different colors according to a color table, such as rainbow color table or heat metal color table, etc.

SUMMARY

The embodiments of the present disclosure provide a device and method for processing image array data and a color table generation method, which can clearly show the details of images for human eyes to observe without any difficulty.

An embodiment of the present disclosure relates to a method for processing image array data, which includes the following steps: providing image array data, including a plurality of first blocks, detected by a sensor at a first time point, wherein each of the first blocks includes a color table corresponding thereto; segmenting image array data detected by the sensor at a second time point into a plurality of second blocks; comparing the image array data of each of the first blocks with the image array data of each of the second blocks to generate image difference information; and allocating the color tables corresponding to the first blocks to the second blocks matching the first blocks according to the image difference information.

Another embodiment of the present disclosure relates to a device for processing image array data, which includes a segmentation module, a comparison module and a color code allocation module. The segmentation module segments image array data detected by a sensor at a second time point into a plurality of second blocks. The comparison module compares the image array data of each of the second blocks with the image array data of each of a plurality of first blocks to generate numerical difference information, wherein the image array data detected by the sensor at a first time point include the first blocks and each of the first blocks includes a color table corresponding thereto. The color code allocation module allocates the color tables corresponding to the first blocks to the second blocks matching the first blocks according to the numerical difference information.

Still another embodiment of the present disclosure relates to a color table generation method, which includes the following steps: arranging a plurality of color codes by a first order according to the color change of the color codes to form a first section; arranging the color codes by a second order contrary to the first order to form a second section; and alternately and repeatedly arranging the first section and the second section to form a color table with infinite length.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

DETAILED DESCRIPTION

Figure 1:
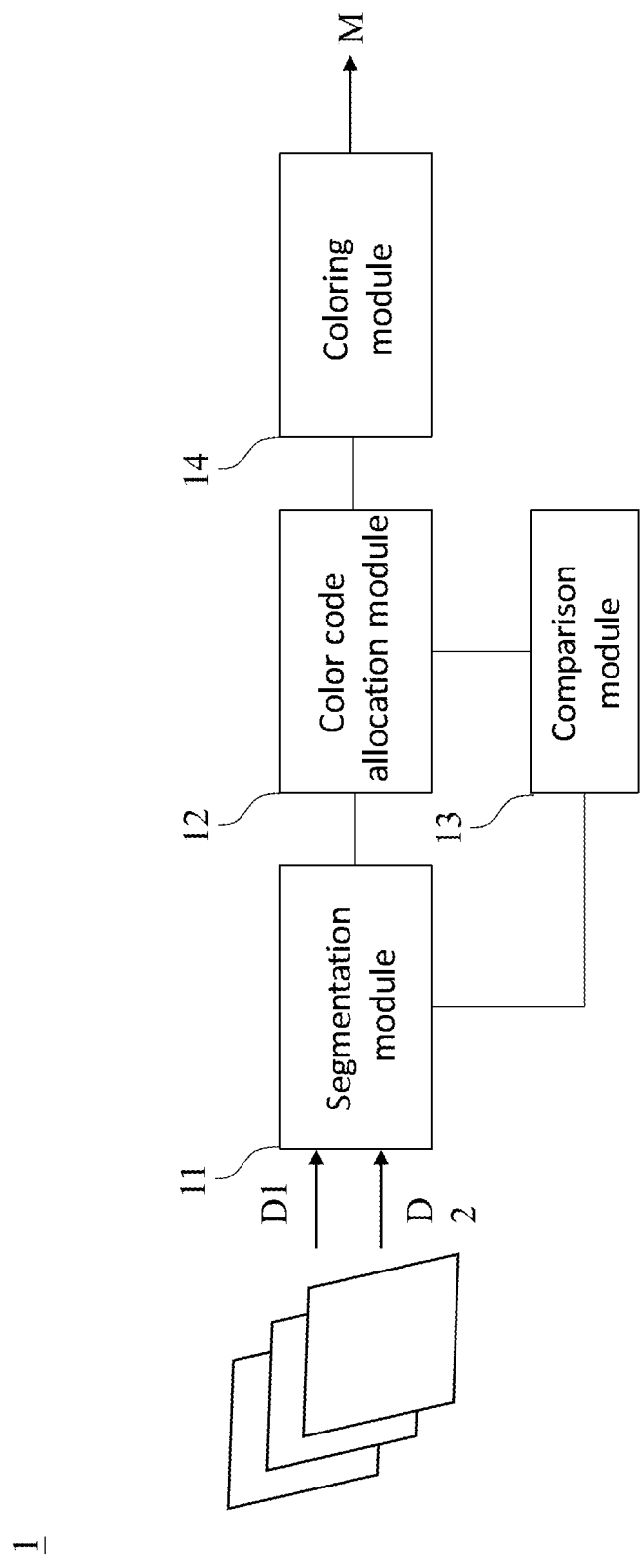
FIG. 1 is a block diagram of a device for processing image array data in accordance with one embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1, which is a block diagram of a device for processing image array data in accordance with one embodiment of the present disclosure. As shown in FIG. 1, the device for processing image array data 1 includes a segmentation module 11, a color code allocation module 12, a comparison module 13 and a coloring module 14. The device 1 may be an image processor, which may be used to process image array data detected by various sensors, such as temperature image array data detected by a thermal imaging camera, distance image array data detected by a depth camera, spectral intensity image array data detected by a spectrum sensor, ultrasonic image array data detected by a medical ultrasonic instrument, etc.

The segmentation module 11 segments the image array data D1 detected by a sensor at a first time point into a plurality of first blocks. In the embodiment, the segmentation module 11 can segment the image array data D1 into the first blocks by using the deep neural network (DNN) algorithm, the semantic segmentation algorithm or the other dynamic numerical segmentation algorithms. For instance, the first blocks may include a background block and one or more moving object blocks (e.g. people or vehicles, etc.); in another embodiment, the segmentation module 11 can segment the image array data D1 into the first blocks by using the position segmentation algorithm, which segments the image array data D1 into a plurality of blocks at specific positions; in still another embodiment, the segmentation module 11 can segment the image array data D1 into the first blocks by using the numerical segmentation algorithm, which segments the image array data D1 into a plurality of blocks with specific intervals.

The color code allocation module 12 is coupled to the segmentation module 11. The color code allocation module 12 numbers color tables and the first blocks, and allocates the color tables to the corresponding first blocks according to the numbers of the first blocks.

The coloring module 14 is coupled to the color code allocation module 12. The coloring module 14 equalizes the first blocks respectively and colors the first blocks by the color tables corresponding to the first blocks according to the equalization result in order to generate a display-formatted data M.

Afterward, the segmentation module 11 segments the image array data D2 detected by the sensor at a second time point into a plurality of second blocks.

The comparison module 13 is coupled to the segmentation module 11 and the color code allocation module 12. The comparison module 13 compares the first blocks with the second blocks to generate the numerical difference information; in other words, the comparison module 13 compares the blocks obtained at the last time point with the blocks obtained at the previous time point. In the embodiment, the comparison module 13 performs a calculation between the image array data of each second block and the image array data of the first blocks (the calculation may be subtraction, etc.), so as to obtain the difference of the second block and each first block, and then generate the numerical difference information.

For example, the comparison module 13 may generate the numerical difference information according to the difference of the second block and each of the first blocks. If the difference of the second block and one of the first blocks is lower than a threshold value, the comparison module 13 sets the numerical difference information between the two blocks as 0. In another embodiment, the comparison module 13 may generate the numerical difference information according to the absolute value of the difference of the second block and each first block. If the absolute value of the difference of the second block and one of the first blocks is lower than a threshold value, the comparison module 13 sets the numerical difference information between the two blocks as 0. In still another embodiment, the comparison module 13 may generate the numerical difference information according to the square difference of the second block and each first block. If the square difference of the second block and one of the first blocks is lower than a threshold value, the comparison module 13 sets the numerical difference information between the two blocks as 0.

In still another embodiment, the comparison module 13 may generate the numerical difference information according to the difference of the data of the second block processed by the discrete cosine transform (DCT) and the data of each first block processed by the discrete cosine transform (DCT). If the difference of the second block and one of the first blocks is lower than a threshold value, the comparison module 13 sets the numerical difference information between the two blocks as 0. In still another embodiment, the comparison module 13 may use a current available feature point detection algorithm, such as FAST, SIFT, SURF or ORB, to capture the feature points from the second block and each first block, and then compare the features points captured from the second block with the feature points captured from each first block in order to generate the numerical difference information. If the feature point comparison result between the second block and one of the first blocks shows that the ratio of the quantity of the matched feature points to the quantity of total feature points captured from the second block is higher than a threshold value, the comparison module 13 sets the numerical difference information between the two blocks as 0.

The color code allocation module 12 determines which of the second blocks match the first blocks according to the numerical difference information and allocates the color tables corresponding to the first blocks to the second blocks matching the first blocks. In the meanwhile, the color code allocation module 12 determines which of the second blocks do not match the first blocks according to the numerical difference information so as to find out the new blocks. Afterward, the color code allocation module 12 numbers the new blocks and select the color tables corresponding to the numbers of the new blocks to allocate the color tables to the new blocks.

The coloring module 14 colors the second blocks corresponding to the first blocks by the color tables corresponding thereto and equalizes the new blocks. Then, the coloring module 14 colors the new blocks by the color tables corresponding thereto according to the equalization result to generate the display-formatted data M.

As described above, the device 1 of the embodiment can determine whether the second blocks obtained by segmenting the image array data at the current time point already exist at the previous time point and then color these second blocks by the color tables corresponding thereto. For the new blocks not existing at the previous time point, the device 1 can additionally allocate the color tables to the new blocks, equalize the new blocks and then color the new blocks by the color tables corresponding thereto according to the equalization result in order to generate the display-formatted data M. Therefore, all blocks can be equalized for only one time instead of being repeatedly equalized, which can make sure that the colors of all numerical values are constant in order to clearly show the details of the image. In addition, each block can be displayed by a unique color table in order to generate the image with stable color combination, which can be more easily observed by human eyes, so is very suitable for processing continuous image array data with high numerical value distribution change.

More specifically, the image array data obtained by at a third time point after the second time point will be processed by the same way of processing the image array data obtained by at the second time point; the only difference is that the comparison module 13 compares the blocks of the image array data obtained at the third time point with the blocks obtained at the previous time point, the second time point.

Figure 2:
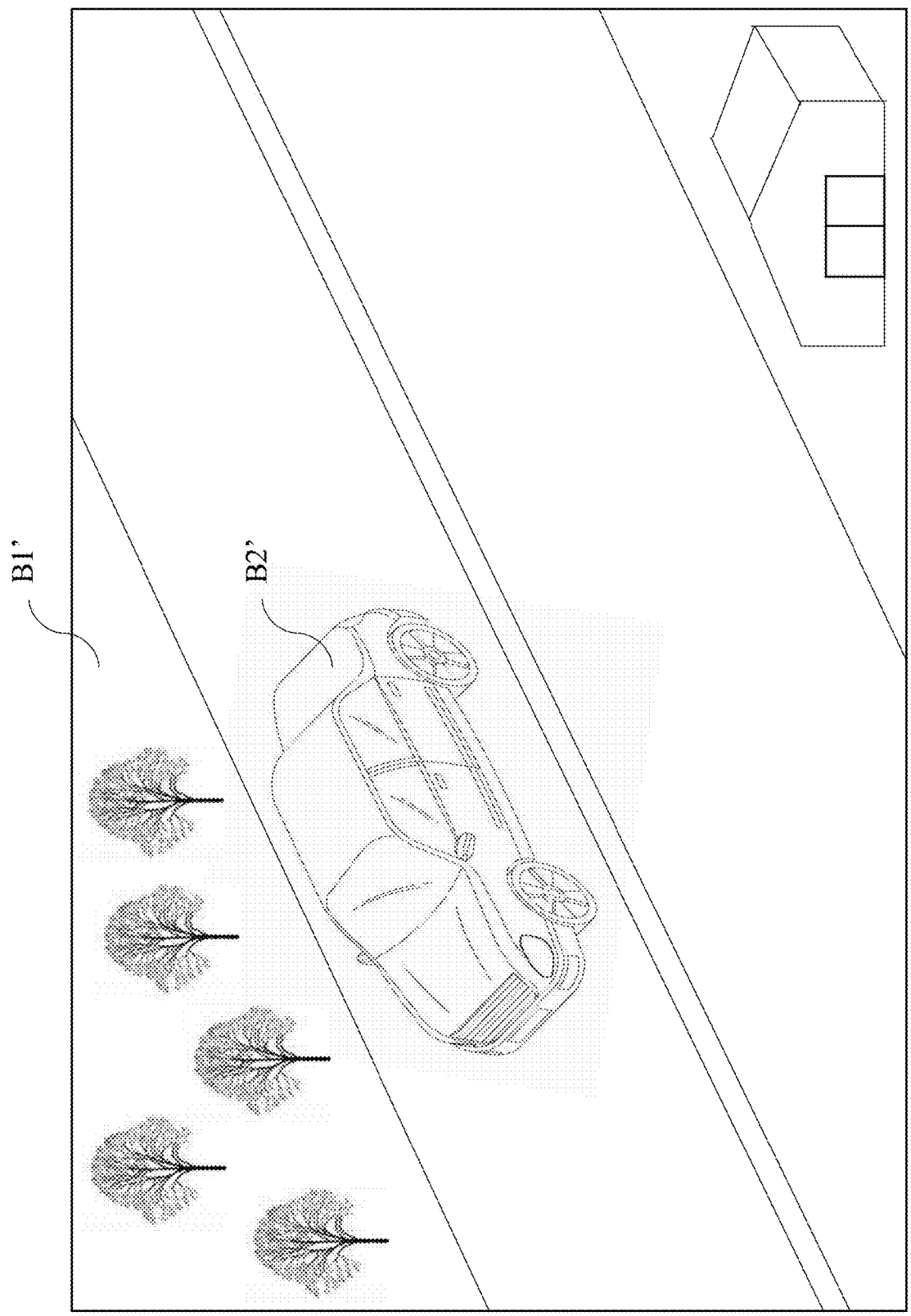
FIG. 2~FIG. 3 are schematic views of the device for processing image array data in accordance with one embodiment of the present disclosure.
Figure 3:
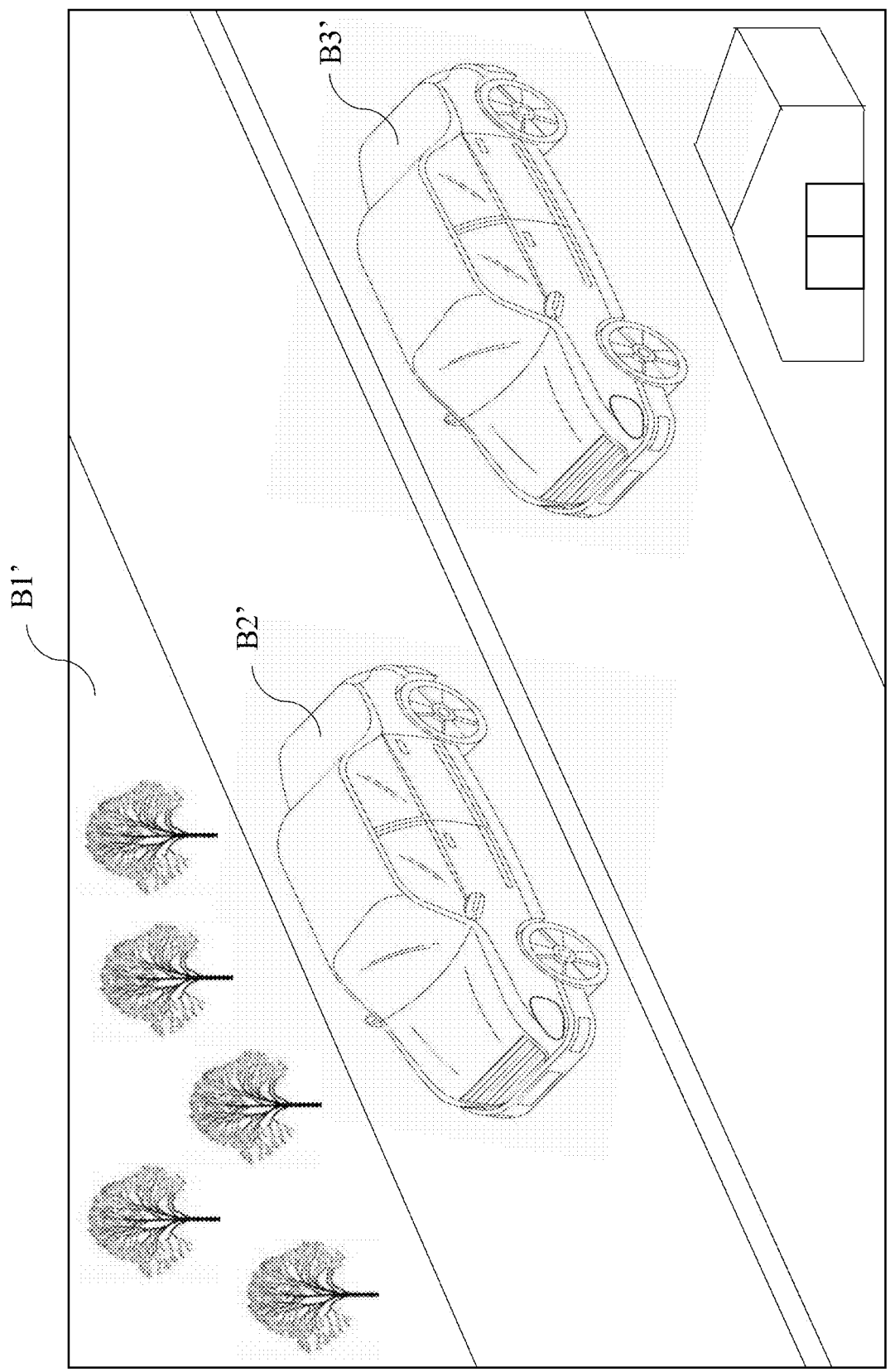

Please refer to FIG. 2 and FIG. 3, which are schematic views of the device for processing image array data in accordance with one embodiment of the present disclosure, and please also refer to FIG. 1. As shown in FIG. 2, the device for processing image array data 1 segments the image array data D1 detected by the sensor at the first time point into several blocks, the first block B1 and the second block B2.

The first block B1 is the background block and the second block B2 is the moving object block. The device 1 numbers the color tables, the first block B1 and the second block B2, and then allocates the corresponding color tables to the first block B1 and the second block B2 according to the numbers of the first block B1 and the second block B2 so as to color the first block B1 and the second block B2, and generate the display-formatted data M. For example, if there are 20 color tables, the device 1 numbers the color tables as No. 1 color table~No. 20 color table, and numbers the first block B1 and the second block B2 as No. 1 block and No. 2 block. Afterward, the device 1 allocates No. 1 color table to No. 1 block and allocates No. 2 color table to No. 2 block; in this way, the color table of each of the blocks is unique.

It is worthy to point out that when the currently available image processing methods (e.g. normalize, histogram equalization and advanced histogram equalization) are applied to process continuous image array data, the colors of the images generated by these image processing methods will keep changing, which cannot be easily observed by human eyes. Thus, these image processing methods are not suitable for processing continuous image array data. On the contrary, according to one embodiment of the present disclosure, the method for processing image array data can make sure that each of the blocks can be displayed by a unique color table, which can be easily observed by human eyes, so is more suitable for processing continuous image array data.

In addition, according to one embodiment of the present disclosure, the method for processing image array data can determine which of the blocks obtained at the current time point match the blocks obtained at the previous time point. Then, the method can allocate the same color tables to the blocks matching the blocks of the previous time point and allocate new color tables to the new blocks, which can make sure that each of the blocks can be displayed by a unique color table in order to generate the image with stable color combination, which can be more easily observed by human eyes.

Moreover, according to one embodiment of the present disclosure, the method for processing image array data can determine which of the blocks obtained at the current time point match the blocks obtained at the previous time point. Then, the method can allocate the same color tables to the blocks matching the blocks of the previous time point and allocate new color tables to the new blocks, which can make sure that each of the numerical values is displayed by the same color to more clearly display the details of the image.

Figure 4:
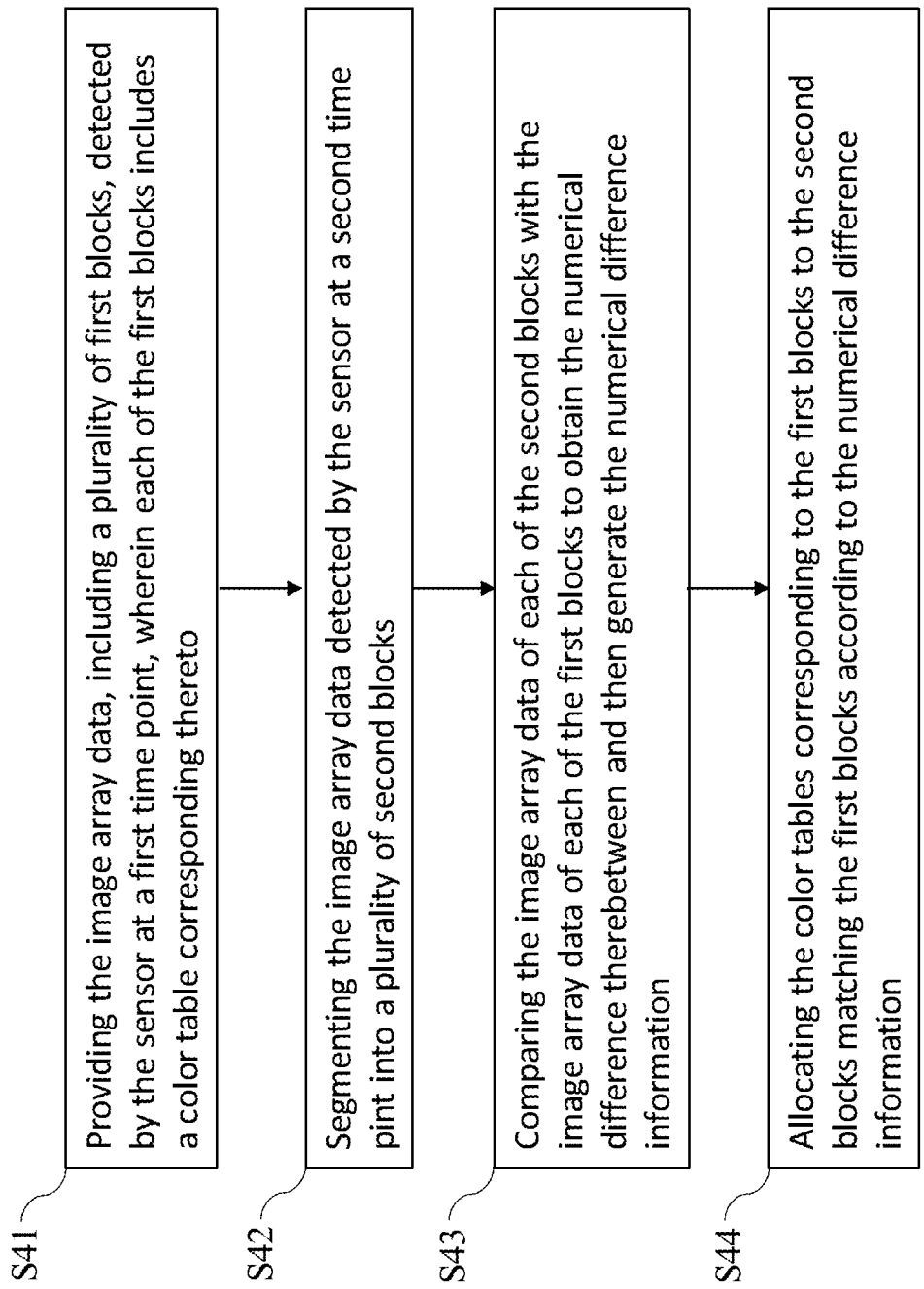
FIG. 4, FIG. 5A and FIG. 5B are flow charts of a method for processing image array data in accordance with one embodiment of the present disclosure.

Please refer to FIG. 4, which is a flow chart of the device for processing image array data in accordance with one embodiment of the present disclosure. As shown in FIG. 4, the method for processing image array data of the embodiment includes the following steps:

Step S41: providing the image array data, including a plurality of first blocks, detected by the sensor at a first time point, wherein each of the first blocks includes a color table corresponding thereto.

Step S42: segmenting the image array data detected by the sensor at a second time pint into a plurality of second blocks.

Step S43: comparing the image array data of each of the second blocks with the image array data of each of the first blocks to obtain the numerical difference therebetween and then generate the numerical difference information. The step is just to compare the second blocks (the second blocks are obtained by segmenting the image array data at the second time point) with the first blocks at the previous time point; in the case, the time point previous to the second blocks is the first time point.

Step S44: allocating the color tables corresponding to the first blocks to the second blocks matching the first blocks according to the numerical difference information.

More specifically, the image array data obtained at the third time point after the second time point is also processed by repeating Step S42, Step S43 and Step S44. In the case, the second time point is the time point previous to the third time point, so the third time point replaces the second time point and the second time point replaces the first time point; besides, the second blocks are replaced by the blocks of the image array data at the third time point and the first blocks are replaced by the second blocks.

The embodiment just exemplifies the present disclosure and is not intended to limit the scope of the present disclosure. Any equivalent modification and variation according to the spirit of the present disclosure is to be also included within the scope of the following claims and their equivalents.

Figure 5A:
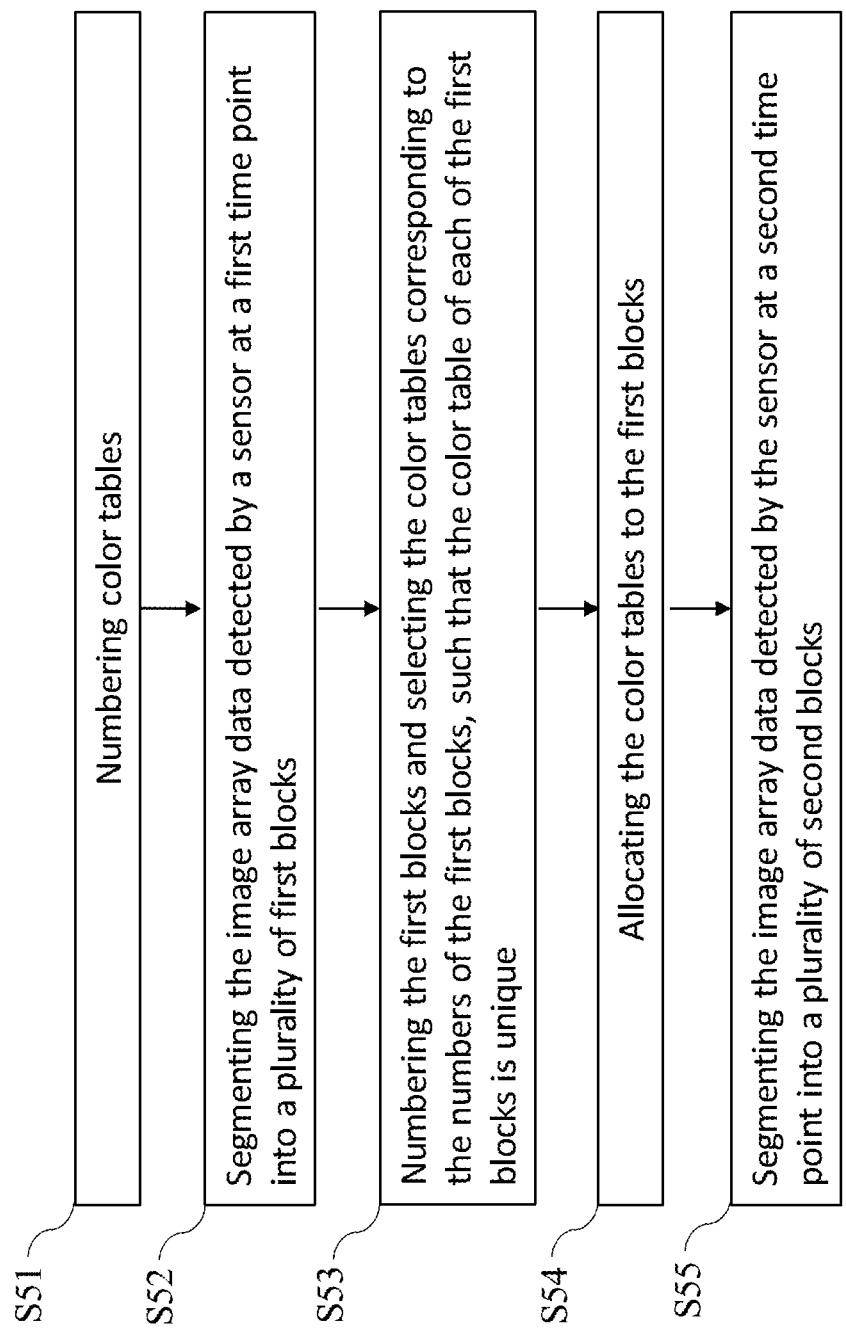
Figure 5B:
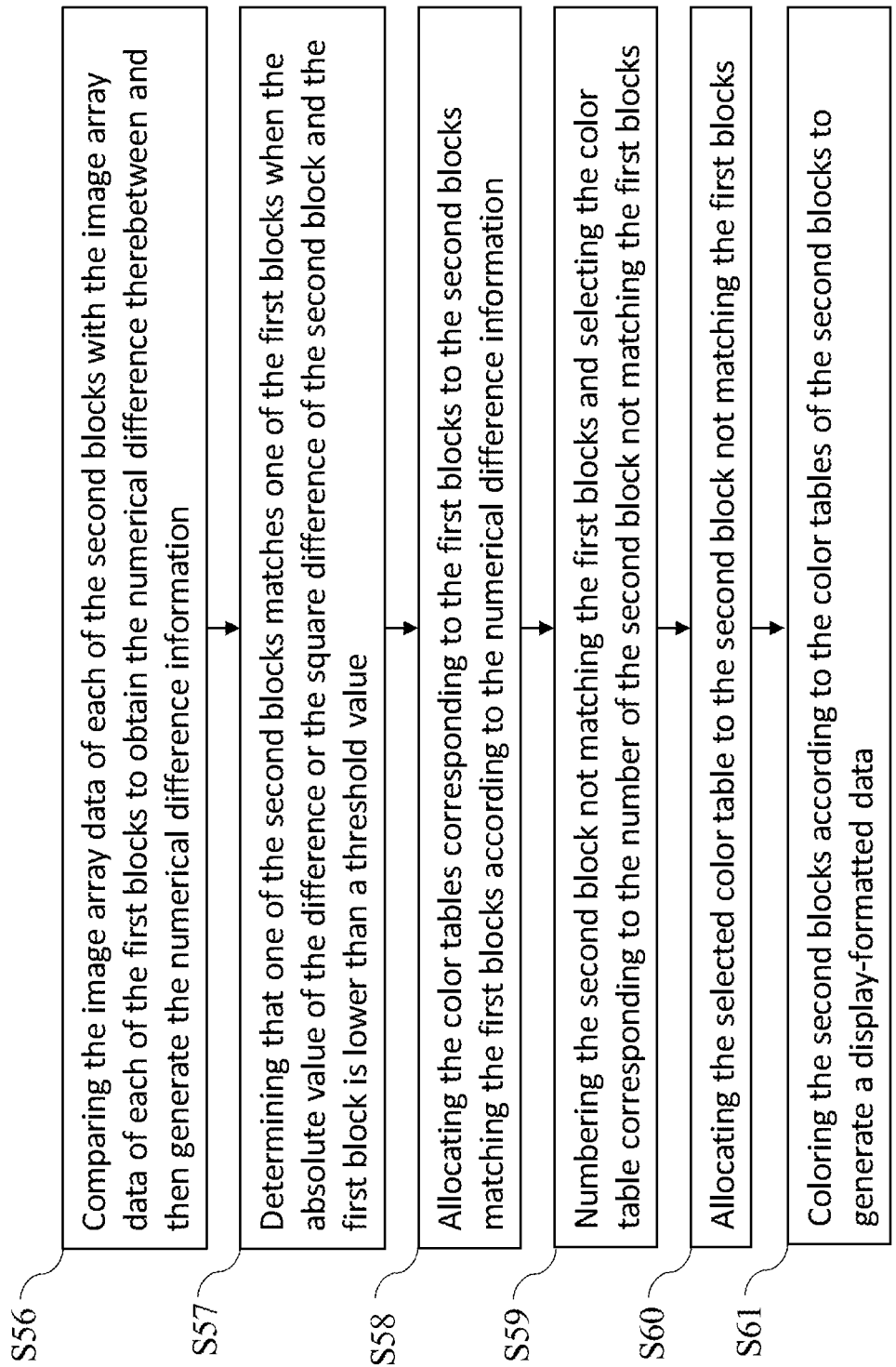

Please refer to FIG. 5A and FIG. 5B, which are flow charts of the device for processing image array data in accordance with one embodiment of the present disclosure. The embodiment illustrates the detailed steps of the method for processing image array data of the embodiment:

Step S51: numbering color tables.

Step S52: segmenting the image array data detected by a sensor at a first time point into a plurality of first blocks.

Step S53: numbering the first blocks and selecting the color tables corresponding to the numbers of the first blocks, such that the color table of each of the first blocks is unique.

Step S54: allocating the color tables to the first blocks.

Step S55: segmenting the image array data detected by the sensor at a second time point into a plurality of second blocks.

Step S56: comparing the image array data of each of the second blocks with the image array data of each of the first blocks to obtain the numerical difference therebetween and then generate the numerical difference information. The step is just to compare the second blocks (the second blocks are obtained by segmenting the image array data at the second time point) with the first blocks at the previous time point; in the case, the time point previous to the second blocks is the first time point.

Step S57: determining that one of the second blocks matches one of the first blocks when the absolute value of the difference or the square difference of the second block and the first block is lower than a threshold value.

Step S58: allocating the color tables corresponding to the first blocks to the second blocks matching the first blocks according to the numerical difference information.

Step S59: numbering the second block not matching the first blocks and selecting the color table corresponding to the number of the second block not matching the first blocks, such that the color table of each of the second blocks is unique.

Step S60: allocating the selected color table to the second block not matching the first blocks.

Step S61: coloring the second blocks according to the color tables of the second blocks to generate a display-formatted data.

More specifically, the image array data obtained at the third time point after the second time point is also processed by repeating Step S55~Step S61. In the case, the second time point is the time point previous to the third time point, so the third time point replaces the second time point and the second time point replaces the first time point; besides, the second blocks are replaced by the blocks of the image array data at the third time point and the first blocks are replaced by the second blocks.

The embodiment just exemplifies the present disclosure and is not intended to limit the scope of the present disclosure. Any equivalent modification and variation according to the spirit of the present disclosure is to be also included within the scope of the following claims and their equivalents.

Figure 6A:
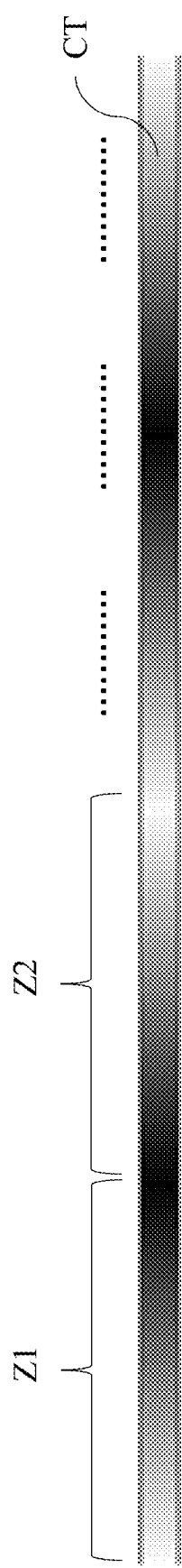
FIG. 6A and FIG. 6B are schematic views of a color table in accordance with one embodiment of the present disclosure.
Figure 6B:

Please refer to FIG. 6A and FIG. 6B, which are schematic views of a color table in accordance with one embodiment of the present disclosure. The device and method for processing image array data of the previous embodiment may adopt an infinite-loop color table CT with infinite length.

The infinite-loop color table CT includes a first section Z1 and a second section Z2, which are alternately and repeatedly arranged.

The first section Z1 is formed by arranging a plurality of color codes by a first order and the second section Z2 is formed by arranging the color codes by a second order contrary to the first order.

As the length of the infinite-loop color table CT is infinite, the color codes thereof are also infinite. Thus, when the infinite-loop color table CT is used to process continuous image array data, the numerical value corresponding to each of the color codes will never be changed. Accordingly, each of the numerical values can be always displayed by the same color, so the details of the image can be clearer.

As shown in FIG. 6A and FIG. 6B, the color codes of the infinite-loop color table CT may be selected from the same color system, such as black-white color system, red color system or green color system, etc.

In another embodiment, the color codes of the infinite-loop color table CT may be selected from different color systems, such as RGB system.

It is worthy to point out that the length of the currently available color tables is finite. Thus, the numerical values corresponding to the color codes may need to be changed when the color codes are insufficient; for the reason, the numerical values may not be displayed the same colors. On the contrary, the method for processing image array data can adopt the color table with infinite length. Therefore, the numerical value corresponding to each of the color codes will never be changed. Accordingly, each of the numerical values can be always displayed by the same color, so the details of the image can be clearer.

Figure 7:
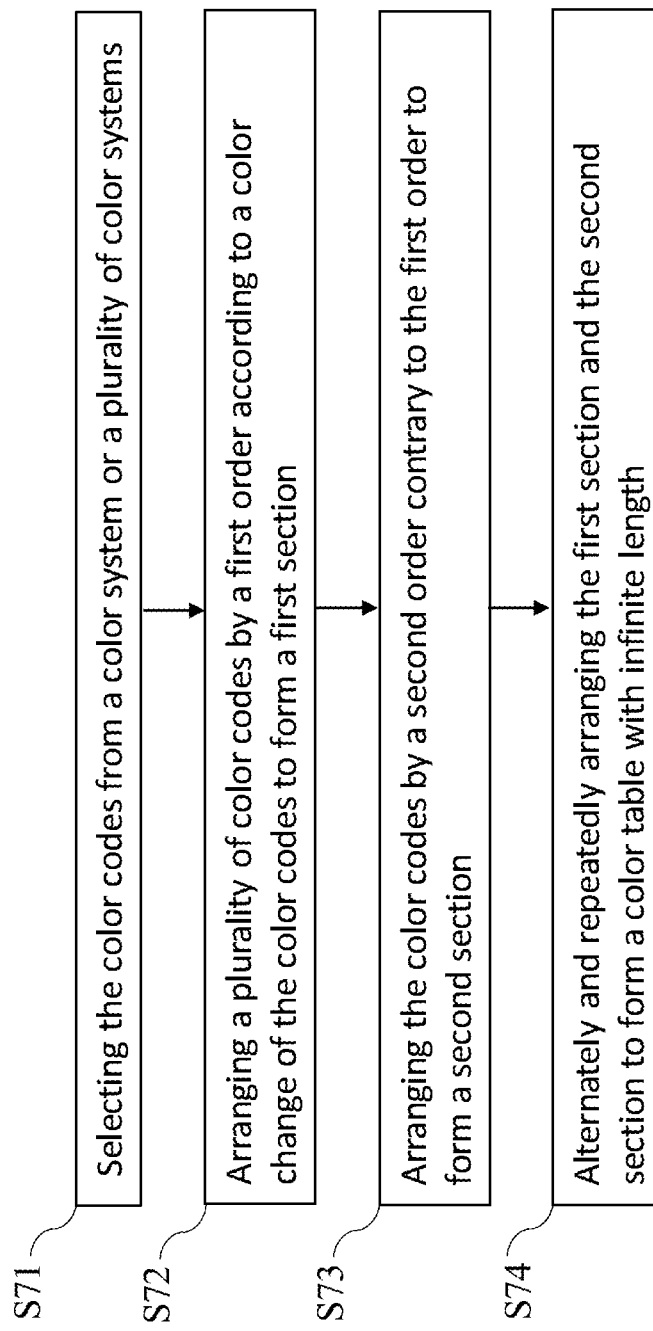
FIG. 7 is a flow chart of a color table generation method in accordance with one embodiment of the present disclosure.

Please refer to FIG. 7, which is a schematic view of a color table generation method in accordance with one embodiment of the present disclosure. The color table generation method of the embodiment includes the following steps:

Step S71: selecting the color codes from a color system or a plurality of color systems.

Step S72: arranging a plurality of color codes by a first order according to a color change of the color codes to form a first section.

Step S73: arranging the color codes by a second order contrary to the first order to form a second section.

Step S74: alternately and repeatedly arranging the first section and the second section to form a color table with infinite length.

The embodiment just exemplifies the present disclosure and is not intended to limit the scope of the present disclosure. Any equivalent modification and variation according to the spirit of the present disclosure is to be also included within the scope of the following claims and their equivalents.

In summation of the description above, according to one embodiment of the present disclosure, the method for processing image array data can determine which of the blocks obtained at the current time point match the blocks obtained at the previous time point. Then, the method can allocate the same color tables to the blocks matching the blocks of the previous time point and allocate new color tables to the new blocks, which can make sure that each of the blocks can be displayed by a unique color table in order to generate the image with stable color combination, which can be more easily observed by human eyes.

In addition, according to one embodiment of the present disclosure, the method for processing image array data can determine which of the blocks obtained at the current time point match the blocks obtained at the previous time point. Then, the method can allocate the same color tables to the blocks matching the blocks of the previous time point and allocate new color tables to the new blocks, which can make sure that each of the numerical values is displayed by the same color to more clearly display the details of the image.

Moreover, according to one embodiment of the present disclosure, the method for processing image array data can adopt the color table with infinite length. Therefore, the numerical value corresponding to each of the color codes will never be changed. Accordingly, each of the numerical values can be always displayed by the same color, so the details of the image can be clearer.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A device for processing image array data, comprising:
a segmentation module, configured to segment an image array data detected by a sensor at a second time point into a plurality of second blocks;
a comparison module, configured to compare array data of each of the second blocks with array data of each of a plurality of first blocks to generate a difference information, wherein an image array data detected by the sensor at a first time point comprises the first blocks, and each of the first blocks comprises a color table corresponding thereto; and a color code allocation module, configured to allocate the color tables corresponding to the first blocks to the second blocks matching the first blocks according to the numerical difference information.

2. The device for processing image array data of claim 1, wherein the segmentation module segments the image array data detected by the sensor at the first time point into the first blocks and the color code allocation module allocates the color tables to the first blocks.

3. The device for processing image array data of claim 1, wherein the color code allocation module further allocates a color table to at least one of second blocks not matching the first blocks; and wherein the color table allocated to the at least one second block not matching the first blocks is different from the color tables allocated to the first blocks and the color tables allocated to the other second blocks matching the first blocks.

4. The device for processing image array data of claim 1, wherein the color code allocation module is configured to number the color tables, the first blocks and a second block not matching the first blocks, to select color tables with numbers corresponding to numbers of the first blocks and the second block not matching the first blocks, and to allocate the selected color tables to the first blocks and the second block not matching the first blocks, whereby the color table of each of the first blocks and the second block not matching the first blocks is unique.

5. The device for processing image array data of claim 1, further comprising a coloring module configured to color the second blocks according to the color tables corresponding to the second blocks to generate a display-formatted data.

6. The device for processing image array data of claim 1, wherein the segmentation module is configured to segment the image array data detected by the sensor by using a position segmentation algorithm, a numerical segmentation algorithm or a dynamic numerical segmentation algorithm.

7. The device for processing image array data of claim 1, wherein the color code allocation module determines that one of the second blocks matches one of the first blocks when the difference of the second block and the first block is lower than a threshold value.

8. The device for processing image array data of claim 1, wherein the color code allocation module determines that one of the second blocks matches one of the first blocks when the square difference of the second block and the first block is lower than a threshold value.

9. A method for processing image array data, comprising:
providing an image array data, including a plurality of first blocks, detected by a sensor at a first time point, wherein each of the first blocks comprises a color table corresponding thereto;
segmenting an image array data detected by the sensor at a second time point into a plurality of second blocks;
comparing an image array data of each of the second blocks with an image array data of each of the first blocks to generate a numerical difference information; and
allocating the color tables corresponding to the first blocks to the second blocks matching the first blocks according to the numerical difference information.

10. The method for processing image array data of claim 9, wherein a step of providing the image array data detected by the sensor at the first time point further comprises:
segmenting the image array data detected by the sensor at a first time point into the first blocks; and
allocating the color tables to the first blocks.

11. The method for processing image array data of claim 9, further comprising:
allocating a color table to at least one of second blocks not matching the first blocks;
wherein the color table allocated to the at least one second block not matching the first blocks is different from the color tables allocated to the second blocks matching the first blocks.

12. The method for processing image array data of claim 9, further comprising:
numbering the color tables;
numbering the first blocks and selecting the color tables corresponding to numbers of the first blocks, whereby the color table of each of the first blocks is unique; and
numbering second blocks not matching the first blocks and selecting the color tables corresponding to a number of the second blocks not matching the first blocks, wherein each of the color tables of the second blocks not matching the first blocks is unique.

13. The method for processing image array data of claim 9, further comprising:
coloring the second blocks according to the color tables of the second blocks to generate a display-formatted data.

14. The method for processing image array data of claim 9, wherein a step of comparing the image array data of each of the first blocks with the image array data of each of the second blocks to generate the numerical difference information further comprises:
generating the numerical difference information according to a difference of each of the first blocks and each of the second blocks.

15. The method for processing image array data of claim 9, wherein a step of allocating the color tables corresponding to the first blocks to the second blocks matching the first blocks according to the numerical difference information further comprises:
determining that one of the second blocks matches one of the first blocks when the difference of the second block and the first block is lower than a threshold value.

16. The method for processing image array data of claim 9, wherein a step of allocating the color tables corresponding to the first blocks to the second blocks matching the first blocks according to the numerical difference information further comprises:
determining that one of the second blocks matches one of the first blocks when a square difference of the second block and the first block is lower than a threshold value.

* * * * *